United States Patent
Chow et al.

(10) Patent No.: US 11,248,953 B2
(45) Date of Patent: Feb. 15, 2022

(54) BROADBAND CALIBRATOR FROM VISIBLE TO LONG WAVE INFRARED

(71) Applicant: RAYTHEON COMPANY, Waltham, MA (US)

(72) Inventors: James R. Chow, San Gabriel, CA (US); Edward Ward, Jr., Redondo Beach, CA (US); Christopher R. Koontz, Manhattan Beach, CA (US); Hans P. Naepflin, El Segundo, CA (US); Steven E. Persh, Redondo Beach, CA (US); Stephen J. Schiller, La Mirada, CA (US); Stephanie Lin, Santa Barbara, CA (US)

(73) Assignee: RAYTHEON COMPANY, Waltham, MA (US)

( * ) Notice: Subject to any disclaimer, the term of this patent is extended or adjusted under 35 U.S.C. 154(b) by 133 days.

(21) Appl. No.: 16/567,756

(22) Filed: Sep. 11, 2019

(65) Prior Publication Data
US 2021/0072074 A1    Mar. 11, 2021

(51) Int. Cl.
*G01J 1/08* (2006.01)
*G01J 3/02* (2006.01)
*G01J 5/52* (2006.01)
*G01J 5/00* (2022.01)

(52) U.S. Cl.
CPC .............. *G01J 1/08* (2013.01); *G01J 3/0297* (2013.01); *G01J 5/522* (2013.01); *G01J 2005/0048* (2013.01)

(58) Field of Classification Search
CPC .................................. G01J 3/0287; G01J 1/08
See application file for complete search history.

(56) References Cited

U.S. PATENT DOCUMENTS

| | | | |
|---|---|---|---|
| 6,836,502 B2 | 12/2004 | Canady et al. | |
| 9,086,327 B2 | 7/2015 | Chow et al. | |
| 9,312,662 B1 | 4/2016 | Larson | |
| 9,459,154 B2 | 10/2016 | Chow et al. | |
| 10,054,485 B2 | 8/2018 | Chow et al. | |
| 10,139,287 B2 | 11/2018 | Chow et al. | |
| 10,168,542 B2 | 1/2019 | Fest et al. | |
| 2010/0243876 A1* | 9/2010 | Resch-Genger | G01N 21/278 250/252.1 |
| 2013/0043390 A1 | 2/2013 | De Ruyter | |
| 2015/0076373 A1* | 3/2015 | Chow | G01J 5/522 250/504 R |
| 2017/0268928 A1* | 9/2017 | Chow | G01J 3/0297 |

(Continued)

FOREIGN PATENT DOCUMENTS

| | | |
|---|---|---|
| WO | 2011050441 A1 | 5/2011 |
| WO | 2014011275 A2 | 1/2014 |
| WO | 2017160382 A1 | 9/2017 |

OTHER PUBLICATIONS

"Assembly," Merriam-Webster.com, Merriam Webster Dictionary, 2021. (Year: 2021).*

(Continued)

*Primary Examiner* — Yara B Green
(74) *Attorney, Agent, or Firm* — Cantor Colburn LLP

(57) ABSTRACT

A broadband calibrator assembly is provided and includes a medium/long wave infrared (MW/LW IR) assembly and multiple ultraviolet (UV)/visible and near IR (VNIR)/short wave IR (SWIR) assemblies.

26 Claims, 7 Drawing Sheets

(56) References Cited

U.S. PATENT DOCUMENTS

2017/0294417 A1* 10/2017 Edmond ............... H01L 33/504
2017/0332017 A1   11/2017 Robinson et al.
2019/0049369 A1*  2/2019 Chow .................. G01N 21/278

OTHER PUBLICATIONS

Fleming, John. "Carbon Nanotube Flat Plate Blackbody Calibrator." 33rd Space Symposium, Apr. 3, 2017, 8 pages.
ISR/WO Application No. PCT/US2020/041491, dated Jan. 20, 2021: pp. 18.

* cited by examiner

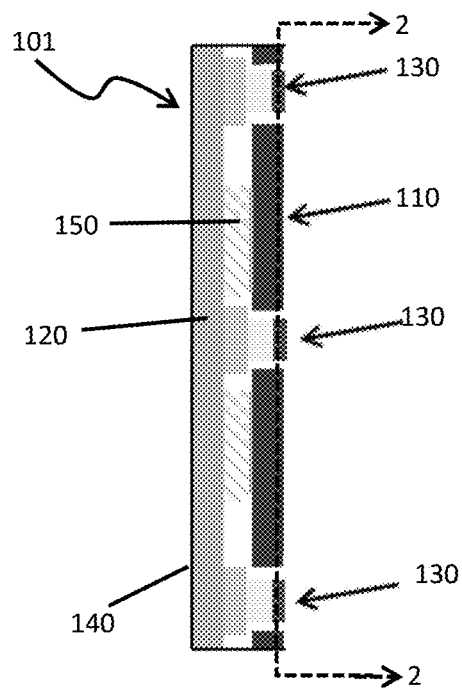
FIG. 1
FIG. 2
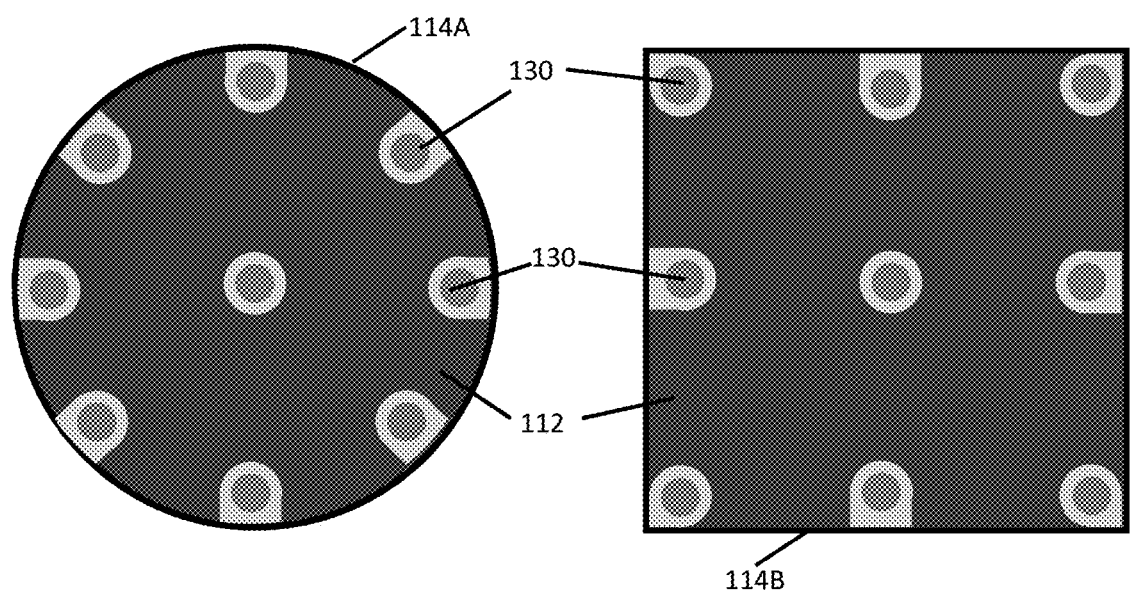

BROADBAND CALIBRATOR FROM VISIBLE TO LONG WAVE INFRARED

BACKGROUND

The present disclosure relates to an apparatus and methods for calibrating an imaging device and, in particular, to an apparatus and method for providing radiation within a band of frequencies from ultraviolet (UV) through longwave infrared (LWIR) for calibration purposes.

Optical sensors are used in a variety of platforms (terrestrial, airborne, space, etc.) to collect information about a scene of interest. Imaging devices take images of Earth and atmosphere locations at narrow or broadband electromagnetic radiation frequencies, such as ultraviolet (UV) frequencies, visible (Vis) light frequencies, near infrared (NIR) frequencies, short wave infrared (SWIR) frequencies, medium wave infrared (MWIR) frequencies, long wave infrared (LWIR) frequencies, etc.

Panchromatic imaging collects information across a single wide spectral band. Multispectral imagers typically collect information across ten to thirty spectral bands. Hyperspectral imaging sensors collect information across over thirty contiguous spectral bands. Ultraspectral imaging sensors collect information across over three hundred very narrow, contiguous spectral bands. These imaging devices require scheduled or periodic calibration using broadband calibrators.

Traditional broadband calibration sources typically include two distinct sources, a blackbody LWIR calibration target and an integrating sphere or solar diffuser calibration target for Vis to MR.

The traditional calibration sources can be problematic for use in resource-constrained platforms such as space platforms however because they can take up a significant portion of the volume and weight of the sensor payload and need greater power in order to thermally and optically stabilize to provide accurate and repeatable frequency and radiant power during the calibration process. The size, mass and power required for these traditional calibration targets scale to the cube of the aperture diameter, limiting the performance of the imaging system by constraining the aperture size or reducing the mass and volume allocation to the imaging system. Traditional bulbs used in integrating spheres for Vis to NIR calibration devices tend to suffer from mechanical fatigue and fracture after cycling on and off over thousands of cycles, thereby requiring the platform to carry multiple bulbs for reliable mission completion. For integrating spheres and calibration sources that utilize solar and other light reflection off of a diffuse reflector, additional equipment is required to monitor the degradation of the spectral properties of the reflective coatings. Such equipment therefore requires additional volume and weight from an already resource-constrained platform.

SUMMARY

According to an aspect of the disclosure, a broadband calibrator assembly is provided and includes a medium/long wave infrared (MW/LW IR) assembly and multiple ultraviolet (UV)/visible and near IR (VNIR)/short wave IR (SWIR) assemblies.

In accordance with additional or alternative embodiments, the MW/LW IR assembly includes a carbon nanotube (CNT) forest layer configured to emit radiation responsive to an application of heat.

In accordance with additional or alternative embodiments, the MW/LW IR assembly further includes thermally conductive and thermally nonconductive layers, the thermally conductive layer includes one or more of a CNT sheet, a graphene sheet and a substrate formed of one or more of a semiconductor, ceramic and diamond and the thermally non-conductive layer includes one or more of adhesive and silicon dioxide.

In accordance with additional or alternative embodiments, the MW/LW IR assembly further includes a heating element to apply heat to the CNT forest layer.

In accordance with additional or alternative embodiments, the heating element includes one or more of a CNT sheet and a graphene sheet.

In accordance with additional or alternative embodiments, the CNT forest layer has an annular shape and the MW/LW IR assembly further includes a ring element disposed about a perimeter of the CNT forest layer and the multiple UV/VNIR/SWIR assemblies are supported by a panel in the ring element about the perimeter of the CNT forest layer.

In accordance with additional or alternative embodiments, the CNT forest layer has a rectangular shape, the MW/LW IR assembly further includes a frame element disposed about a perimeter of the CNT forest layer and the multiple UV/VNIR/SWIR assemblies are supported by a panel in the frame element about the perimeter of the CNT forest layer.

In accordance with additional or alternative embodiments, the frame element is configured to thermally isolate the MW/LW IR assembly from the UV/VNIR/SWIR assembly.

In accordance with additional or alternative embodiments, each of the multiple UV/VNIR/SWIR sources includes an LED array configured to emit first radiation at a first wavelength.

In accordance with additional or alternative embodiments, each of the multiple UV/VNIR/SWIR sources further includes a conversion panel configured to convert the first radiation into second radiation and to emit the second radiation at a second wavelength differing from the first wavelength.

In accordance with additional or alternative embodiments, the LED array includes LEDs configured to emit light in various frequencies.

In accordance with additional or alternative embodiments, the MW/LW IR assembly is formed to define apertures and each aperture includes an opening or spectral filters respectively corresponding to a corresponding one of the multiple UV/VNIR/SWIR assemblies.

In accordance with additional or alternative embodiments, each aperture includes one or more of lenses, filters and windows.

In accordance with additional or alternative embodiments, each of the lenses includes one or more of Fresnel lenses and metasurfaces.

In accordance with additional or alternative embodiments, the conversion panel includes a phosphor layer.

In accordance with additional or alternative embodiments, the phosphor layer includes one or more of 0.4-3.0 µm phosphors dispersed on a carrier layer.

In accordance with additional or alternative embodiments, the phosphor layer includes colloidal quantum dots.

In accordance with additional or alternative embodiments, the carrier layer includes one or more of acrylic, polyethylene terephthalate (PET), polycarbonate, polydimethylsiloxane (PDMS), borosilicate, Germanium, ZnS, ZnSe, Silicon, $SiO_2$, crown glasses, diamond, silicon carbide and sapphire.

In accordance with additional or alternative embodiments, the broadband calibrator further includes a panel adjacent to the MW/LW IR assembly and a housing to house the MW/LW IR assembly, the panel, each of the multiple UV/VNIR/SWIR assemblies and one or more thermal modulating elements interposed between the MW/LW IR assembly and the panel.

In accordance with additional or alternative embodiments, each of the one or more thermal modulating elements abuts with a rear surface of the MW/LW IR assembly.

In accordance with additional or alternative embodiments, each thermal modulating element includes a thermoelectric cooler.

In accordance with additional or alternative embodiments, the MW/LW IR assembly and the multiple UV/VNIR/SWIR assemblies are disposed in a detector apparatus including a detector element and a controller and the MW/LW IR assembly and the multiple UV/VNIR/SWIR assemblies are movable into view of the detector element and the controller is configured to control the MW/LW IR assembly to emit a first type of radiation at a first wavelength range and intensity toward the detector element, control one or more of the multiple UV/VNIR/SWIR assemblies to emit a second type of radiation at a corresponding one or more second wavelength range and intensity toward the detector element, confirm that the detector element detects the first type of radiation and the second type of radiation in such a manner as to recognize that the first type of radiation is at the first wavelength range and intensity and that the second type of radiation is at the corresponding one or more second wavelength range and intensity and calibrate the detector element in accordance with results of the confirming.

In accordance with additional or alternative embodiments, the MW/LW IR assembly and the multiple UV/VNIR/SWIR assemblies are disposed in a detector apparatus including a detector element and a controller, at least the multiple UV/VNIR/SWIR assemblies are movable into view of the detector element and the controller is configured to control one or more of the multiple UV/VNIR/SWIR assemblies to emit a type of radiation at a corresponding one or more wavelength range and intensity toward the detector element, confirming that the detector element detects the type of radiation in such a manner as to recognize that the type of radiation is at the wavelength range and intensity and calibrating the detector element in accordance with results of the confirming.

According to another aspect of the disclosure, a medium/long wave infrared (MW/LW IR) assembly for use in a broadband calibrator is provided and includes a heating element and a carbon nanotube (CNT) forest layer, the CNT forest layer including a layer of at least one of graphene paper and coplanar, parallel CNTs and being configured to emit radiation along longitudinal axes of the coplanar, parallel CNTs in response to an application of heat by the heating element.

In accordance with additional or alternative embodiments, the CNT forest layer has an annular shape.

In accordance with additional or alternative embodiments, the CNT forest layer has a rectangular shape.

In accordance with additional or alternative embodiments, the CNT forest layer includes windows or apertures.

According to another aspect of the disclosure, an ultraviolet (UV)/visible and near infrared (VNIR)/short wave infrared (SWIR) assembly for use in a broadband calibrator is provided and includes an LED array configured to emit first radiation at a first wavelength and a conversion panel configured to convert the first radiation into second radiation and to emit the second radiation at a second wavelength differing from the first wavelength.

In accordance with additional or alternative embodiments, the conversion panel includes a phosphor layer disposed on a carrier layer.

In accordance with additional or alternative embodiments, the phosphor layer includes one or more of 0.4-3.0 µm phosphors.

According to another aspect of the disclosure, a method of operating a medium/long wave infrared (MW/LW IR) assembly and multiple ultraviolet (UV)/visible and near IR (VNIR)/short wave IR (SWIR) assemblies packaged into a broadband calibrator assembly is provided and includes controlling the MW/LW IR assembly to emit a first type of radiation at a first wavelength range and intensity toward a detector, controlling one or more of the multiple UV/VNIR/SWIR assemblies to emit a second type of radiation at a corresponding one or more second wavelength range and intensity toward the detector, confirming that the detector detects the first type of radiation and the second type of radiation in such a manner as to recognize that the first type of radiation is at the first wavelength range and intensity and that the second type of radiation is at the corresponding one or more second wavelength range and intensity and calibrating the detector in accordance with results of the confirming.

In accordance with additional or alternative embodiments, the calibrating includes at least one of determining that the detector recognizes that the first radiation is at a wavelength range, which is different from the first wavelength range and intensity and compensating for the difference, and determining that the detector recognizes that the second radiation is at one or more wavelength ranges, which is respectively different from the corresponding one or more second wavelength range and intensity and compensating for the difference.

In accordance with additional or alternative embodiments, the MW/LW IR assembly and the multiple UV/VNIR/SWIR assemblies are located at a pupil of an optical system.

According to another aspect of the disclosure, a broadband calibrator assembly is provided and includes a panel, multiple ultraviolet (UV)/visible and near IR (VNIR)/short wave IR (SWIR) sources disposed on the panel and a medium/long wave infrared (MW/LW IR) assembly defining apertures over the UV/VNIR/SWIR sources.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts:

FIG. 1 is a side view of a broadband calibrator in accordance with embodiments;

FIG. 2 is an axial view of broadband calibrators of FIG. 1 of alternative embodiments taken along line 2-2;

DETAILED DESCRIPTION

Figure 3:
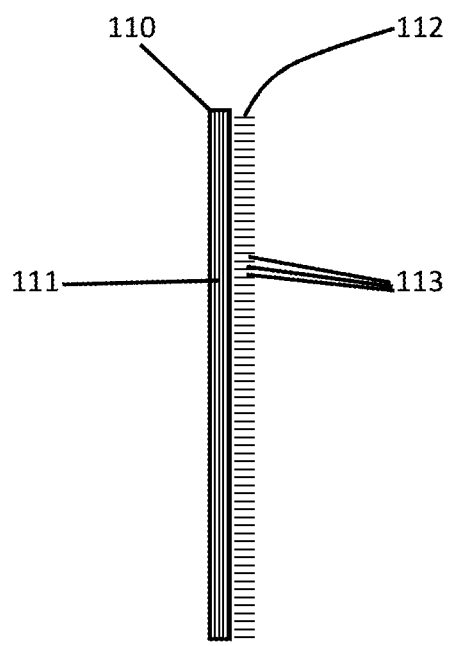
FIG. 3 is an enlarged side view of a medium/long wave infrared (MW/LW IR) assembly of the broadband calibrator of FIG. 1.

As will be described below, a broadband calibrator is provided and includes an implementation of ultraviolet, visible, NIR and SWIR LEDs, phosphors and quantum dots combined with carbon nanotubes to provide an on-demand visible through long wavelength infrared source with a thin profile and a compact package. The ultraviolet LEDs are disposed to excite the phosphors and quantum dots to emit radiation in the near infrared wavelengths (i.e., 0.4 to 3.0 μm). The carbon nanotubes emit radiation in the mid and long wavelength infrared (3.0 to 14 μm). The broadband calibrator can be configured in multiple configurations including, but not limited to, square, rectangular, annular, circular or elliptical. The configurations described herein will focus on an annular or circular layout but it is to be understood that this is done for purposes of clarity and brevity only.

With reference to FIGS. 1-4, a broadband calibrator assembly 101 is provided and includes a medium/long wave infrared (MW/LW IR) assembly 110, a planar or flat panel 120 disposed adjacent to the MW/LW IR assembly 110, multiple ultraviolet (UV)/visible and near IR (VNIR)/short wave IR (SWIR) assemblies 130 disposed on the panel 120, and a housing 140. The housing 140 is configured to house the MW/LW IR assembly 110, the panel 120, each of the multiple UV/VNIR/SWIR assemblies 130 and one or more thermal modulating (i.e., cooling and/or heating) elements 150, which are interposed between the MW/LW IR assembly 110 and the panel 120 and which, in some cases, can include thermoelectric devices. Each of the one or more thermal modulating elements 150 can include a thermoelectric cooler and abuts with a rear surface of the MW/LW IR assembly 110. The one or more thermal modulating elements 150 serve to thermally control the MW/LW IR assembly 110 and may be thermally isolated from the panel 120 so that heat does not affect various operations of each of the multiple UV/VNIR/SWIR assemblies 130 (each of the UV/VNIR/SWIR assemblies 130 can be, but is not required to be thermally isolated).

As shown in FIG. 3 and in accordance with embodiments, the MW/LW IR assembly 110 includes a heating element 111 and a carbon nanotube (CNT) forest layer 112 (also shown in FIG. 2). The CNT forest layer 112 can include, for example, at least one of graphene paper and an array of substantially coplanar and substantially parallel CNTs 113, which are aligned perpendicular to the graphene paper, and is configured to emit radiation along the respective substantially parallel longitudinal axes of the substantially coplanar and substantially parallel CNTs 113 in response to an application of heat by the heating element 111. The heating element 111 can be provided as one or more of a thermal spreading layer and a thermocouple interposed between the CNT forest layer 112 and an additional CNT layer. Under operational conditions when rapid temperature increases are required, additional heat energy can be generated using the one or more thermal modulating elements 150. In any case, the radiation emitted by the CNT forest layer 112 can have a wavelength of about 3.0 μm to about 14 or more μm.

As shown in FIG. 2 and in accordance with further embodiments, the CNT forest layer 112 has an annular or circular shape (see the image on the left side of FIG. 2) or a rectangular shape (see the image on the right side of FIG. 2) and the MW/LW IR assembly 110 further includes a ring element 114A or a frame element 114B. The ring element 114A can be disposed about a perimeter of the CNT forest layer 112 with the annular or circular shape and components of each of the multiple UV/VNIR/SWIR assemblies 130 can thus be supported by the panel 120 in an annular or circular array in the ring element 114A about the perimeter of the CNT forest layer 112. The frame element 114B can be disposed about a perimeter of the CNT forest layer 112 with the rectangular shape and components of each of the multiple UV/VNIR/SWIR assemblies 130 can thus be supported in a rectangular array in the frame element 114A about the perimeter of the CNT forest layer 112.

It is to be understood that alternative geometries can be utilized which will then require appropriate design modifications to obtain analogous radiative performance. In particular, certain rectangular and square geometries can be designed which can lend themselves to more convenient manufacturing formats in some but not all cases.

Figure 4:
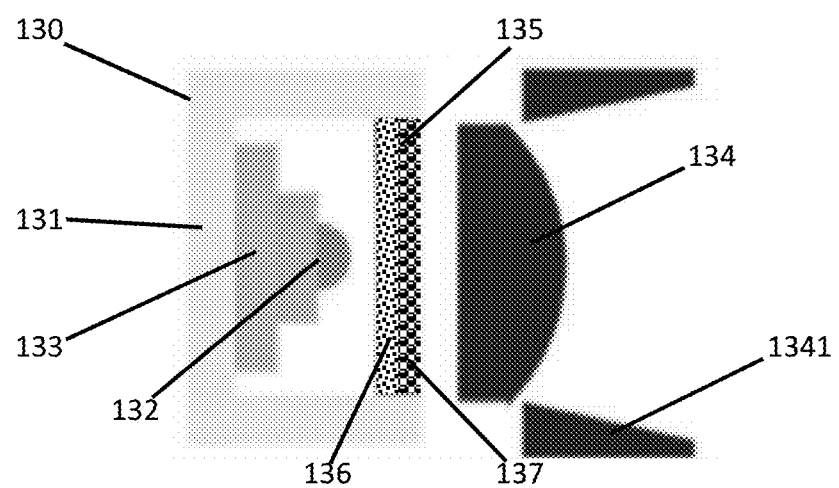
FIG. 4 is an enlarged side view of an ultraviolet (UV)/visible and near infrared (VNIR)/short wave infrared (SWIR) assembly of the broadband calibrator of FIG. 1.

As shown in FIG. 4 and in accordance with embodiments, each of the multiple UV/VNIR/SWIR assemblies 130 can include a frame 131 that is supportively disposed on the panel 120, an LED array 132 and a wiring board 133. The wiring board 133 is interposed between the frame 131 and the LED array 132 and is configured to supply the LED array 132 with electricity by which the LED array 132 emits first radiation at a first wavelength. Each of the multiple UV/VNIR/SWIR assemblies 130 further includes a lens element 134 as well as reflective element 1341 and a conversion panel 135, though it is to be understood that the lens element 134 could be provided as another type of optical element. The conversion panel 135 is optically interposed between the LED array 132 and the lens element 134 and is configured to convert the first radiation into second radiation and to emit the second radiation through the lens element 134 at a second wavelength differing from the first wavelength. For each of the multiple UV/VNIR/SWIR assemblies 130, the lens element 134 can be supported by the frame 131 in the ring element 114A (see FIG. 2) or by the frame 131 in the frame element 114B (see FIG. 2) of the MW/LW IR assembly 110.

In accordance with embodiments, the lens element 134 may include or be provided as a Fresnel lens or metasurface to focus the second radiation into a smaller solid angle. As used herein, a metasurface refers to aperiodic nano-features over a large area (>100× the wavelength) exploiting electromagnetic physics to precisely control optical waves.

In accordance with further embodiments, the conversion panel 135 of each of the multiple UV/VNIR/SWIR assemblies 130 includes a phosphor layer 136, which is disposed to face the LED array 132 and the lens element 134 at respective distances and an optical window or spectral filter 137 to attenuate the first radiation from the LED array 132. For each of the multiple UV/VNIR/SWIR assemblies 130, the phosphor layer 136 can include one or more of 0.3-1.0 µm phosphors and 1.0-3.0 µm phosphors or, more generally, one or more of 0.4-3.0 µm phosphors dispersed on a carrier layer. In accordance with embodiments, the phosphor layer 136 can include colloidal quantum dots. The colloidal quantum dots can include one or more of cadmium sulphide (CdS), zinc sulphide (ZnS), cadmium sulphide selenium (CdSSe), cadmium telluride (CdTe), cadmium selenium telluride (CdSeTe), cadmium sulphide selenium (CdSSe), nitrides, silicates, KSF (e.g. K2SiF6:Mn4+), SGS (e.g., SrGa2S4:Eu2+), YAG (Y3Al5O12), YAGG (Y3Al2Ga3O12), LiGa5O8:Ni, KMgF3:Ni and MgF3:Ni. In accordance with additional or alternative embodiments, the carrier layer can include one or more of acrylic, polyethylene terephthalate (PET), polycarbonate, polydimethylsiloxane (PDMS), borosilicate, germanium (Ge), zinc sulphide (ZnS), zinc selenium (ZnSe), silicon, silicon dioxide (SiO$_2$), crown glasses, diamond, silicon carbide and sapphire.

In greater detail, the conversion panel 135 can include two or more radiative down-conversion layers, one of which is disposed to face the LED array 132 and a second radiative down-conversion layer that is disposed to face the lens 134. Depending upon the final optical emission spectrum and intensity, each of the down-conversion layers can be selected from a family of phosphors and/or a family of quantum dots.

For each of the multiple UV/VNIR/SWIR assemblies 130, the LED array 132 is activated by the wiring board 133 to emit UV or visible light. This UV or visible light is absorbed by the phosphor layer 136, which is consequently excited and emits at longer wavelengths, such as VNIR wavelengths for example. This emission can be directed, for example, at a second spectral down-conversion layer including quantum dots which emit near and short wave IR radiation in the 0.3-1.0 µm and 1.0-3.0 µm ranges.

Figure 5:
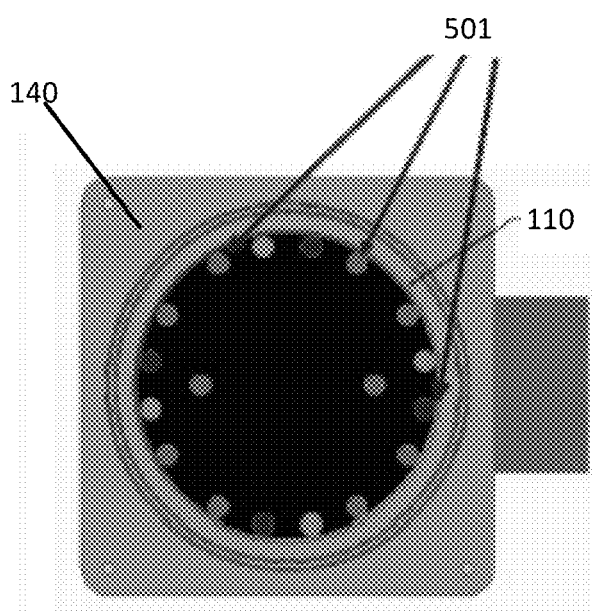
FIG. 5 is an axial view of components of a broadband calibrator in accordance with alternative embodiments.

With reference to FIG. 5, the MW/LW IR assembly 110 is provided in an alternative configuration in which the CNT forest layer 112 includes an annular or circular array of windows 501. Each window 501 respectively corresponds to a corresponding one of the multiple UV/VNIR/SWIR assemblies 130.

Figure 6:
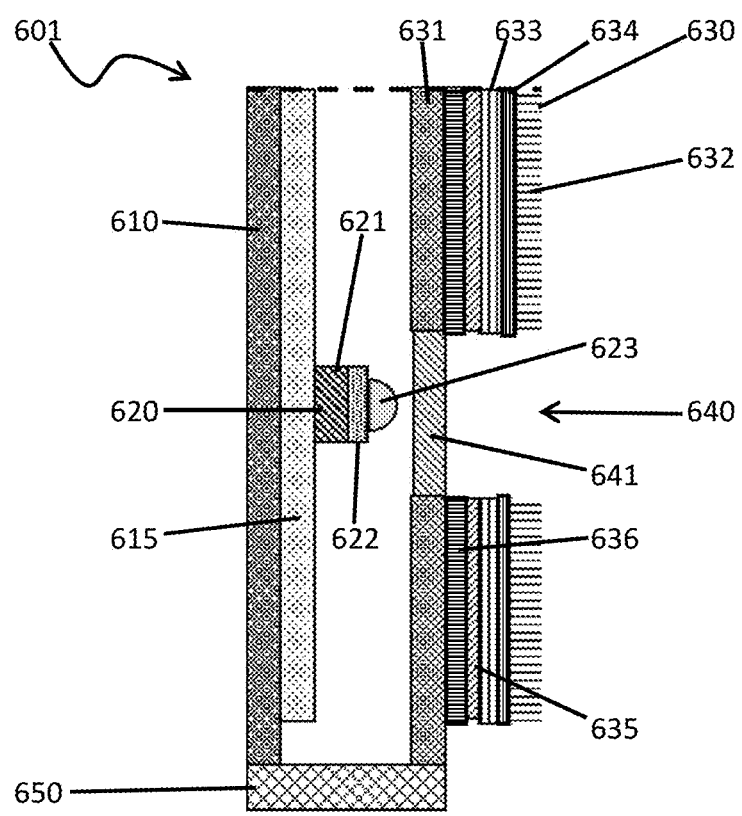
FIG. 6 is a side view of a broadband calibrator in accordance with embodiments.
Figure 7:
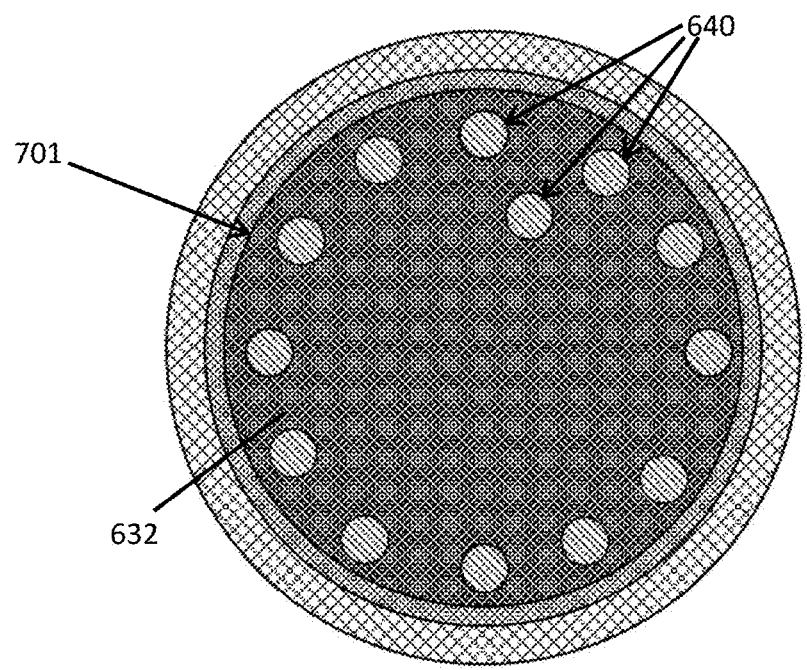
FIG. 7 is an axial view of a broadband calibrator in accordance with embodiments.

With reference to FIGS. 6 and 7, a broadband calibrator assembly 601 is provided and includes a panel 610, a printed wiring board (PWB) 615 disposed on the panel 610, multiple UV/VNIR/SWIR sources 620 disposed on the PWB 615 and, in turn, on the panel 610 and a MW/LW IR assembly 630. The MW/LW IP assembly 630 is formed to define an aperture 640 over each of the UV/VNIR/SWIR sources 620. While the broadband calibrator assembly 601 can be provided with a single UV/VNIR/SWIR source 620 and a single aperture 640, the following description will relate to the case of multiple UV/VNIR/SWIR sources 620 and an aperture 640 for each. The broadband calibrator assembly 601 can further include a housing 650 to house the MW/LW IR assembly 630, the panel 610, each of the multiple UV/VNIR/SWIR assembly sources 620 and one or more thermal modulating elements interposed between the MW/LW IR assembly 620 and the panel 610.

The MW/LW IR assembly 630 includes a support plate 631 and a planar CNT forest layer 632 disposed on the support plate 631. The planar CNT forest layer 632 is configured to emit radiation in response to an application of heat thereto or in response to a removal of heat therefrom.

The MW/LW IR assembly 630 further includes a thermally conductive layer 633 and a thermally nonconductive layer 634 interposed between the planar CNT forest layer 632 and the support plate 631. The thermally conductive layer 633 includes one or more of a CNT sheet and a graphene sheet and a substrate that includes one or more of a semiconductor, ceramic and diamond. The thermally nonconductive layer 634 includes one or more of adhesive and silicon dioxide. In accordance with embodiments, the MW/LW IR assembly 630 can also include the one or more thermal modulating elements of the broadband calibrator assembly 601, such as a heating element 635, which can in turn include one of a CNT sheet and a graphene sheet, to apply heat to the planar CNT forest layer 632 and a cooling element 636 (i.e., a thermoelectric cooler) to remove heat from the planar CNT forest layer 632.

As shown in FIG. 7, the planar CNT forest layer 632 can have an annular shape 701, for example. In these or other cases, the MW/LW IR assembly 630 can further include a ring element that is disposed about a perimeter of the planar CNT forest layer 632. Here, the multiple UV/VNIR/SWIR assembly sources 620 can be supported in the ring element about the perimeter of the planar CNT forest layer 632 (as shown in FIG. 2, the planar CNT forest layer 632 can also have a rectangular shape, the MW/LW IR assembly 630 can include a frame element disposed about a perimeter of the planar CNT forest layer 632 and the multiple UV/VNIR/SWIR assembly sources 620 can be supported in the frame element about the perimeter of the planar CNT forest layer). The ring element, the frame element and housing 650 can both be configured to thermally isolate the MW/LW IR assembly 630 from the UV/VNIR/SWIR assembly sources 630.

Each of the multiple UV/VNIR/SWIR assembly sources 620 can include an LED array 621 that is configured to emit first radiation at a first wavelength (i.e., at multiple first wavelengths or at various frequencies), a conversion panel 622 that is configured to convert the first radiation into second radiation and to emit the second radiation at a second wavelength differing from the first wavelength and a lens 623. Each aperture 640 can include spectral filters that are optically designed to respectively correspond to an emitted frequency of a corresponding one of the multiple UV/VNIR/SWIR assembly sources 620. To this end, each aperture 640 can include an optical element 641 such as one or more of lenses, filters and windows.

In accordance with embodiments, the conversion panel 622 can be disposed in a plane of the support plate 631 of the MW/LW IR assembly 630.

In accordance with embodiments, the conversion panel 622 can include a phosphor layer where the phosphor layer includes one or more of 0.4-3.0 µm phosphors dispersed on a carrier layer and colloidal quantum dots. The colloidal quantum dots can include one or more of cadmium sulphide (CdS), zinc sulphide (ZnS), cadmium sulphide selenium (CdSSe), cadmium telluride (CdTe), cadmium selenium telluride (CdSeTe), cadmium sulphide selenium (CdSSe), nitrides, silicates, KSF (e.g. K2SiF6:Mn4+), SGS (e.g., SrGa2S4:Eu2+), YAG (Y3Al5O12), YAGG (Y3Al2Ga3O12), LiGa5O8:Ni, KMgF3:Ni and MgF3:Ni. In accordance with additional or alternative embodiments, the carrier layer can include one or more of acrylic, polyethylene terephthalate (PET), polycarbonate, polydimethylsiloxane (PDMS), borosilicate, germanium (Ge), zinc sulphide (ZnS), zinc selenium (ZnSe), silicon, silicon dioxide (SiO$_2$), crown glasses, diamond, silicon carbide and sapphire.

While the embodiments of FIGS. 1-5 and the embodiments of FIGS. 6 and 7 are described herein separately, it is to be understood that the various embodiments are interchangeable with one another and that embodiments described herein with respect to FIGS. 1-5 are applicable to the embodiments of FIGS. 6 and 7 and vice versa. For example, the thermally conductive layer 633 and the thermally nonconductive layer 634 of FIGS. 6 and 7 have minimal thermal mass to transition quickly, each of the panel 610 and the support plate 631 of FIGS. 6 and 7 provides structural support and conducts heat away from the assemblies and the MW/LW IR assembly 630 of FIGS. 6 and 7 does not make direct physical contact with the UV/VNIR/SWIR assembly sources 620. These features are included in the embodiments of FIGS. 1-5 as well.

Figure 8:
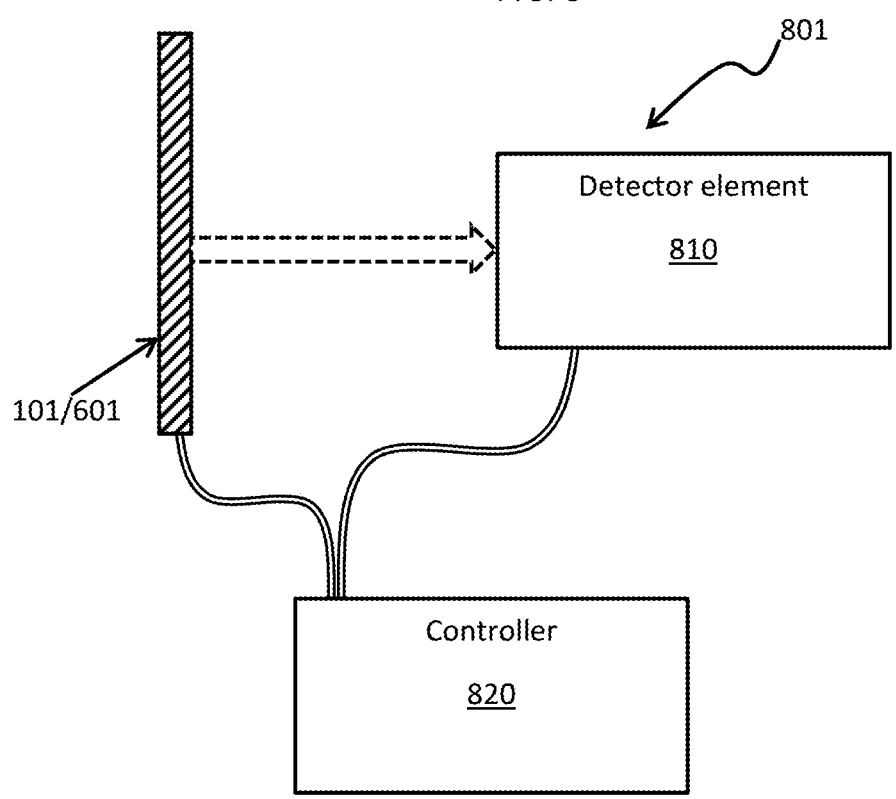
FIG. 8 is a schematic diagram of a detector apparatus in accordance with embodiments.

With reference to FIG. 8, a detector apparatus 801 is provided and includes the broadband calibrator assembly 101/601 of FIGS. 1-4, FIG. 5 and/or FIGS. 6 and 7, a detector element 810 to be calibrated and a controller 820. The controller 820 is configured to control the broadband calibrator assembly 101/601 to emit radiation toward the detector element 810 at selected UV, Vis, NIR, SWIR, MWIR and LW IR wavelengths (i.e., to control the MW/LW IR assembly 110 to emit radiation at about 3.0 µm to about 14 or more µm and/or to control the multiple UV/VNIR/SWIR assemblies 130 to emit radiation in the 0.3-3.0 µm ranges) and to calibrate the detector element 810 at each of the selected UV, Vis, NIR, SWIR, MWIR and LW IR wavelengths.

As described herein, the detector apparatus 801 is capable of spectral calibration. This involves outputting radiation of a known frequency toward a broadband instrument, including a detector element 810, and checking that the correct channel in the broadband instrument responds. Another method of operation would be to use the detector element 810 for radiometric (measure instrument response to a known radiance within a spectral range) and image quality (measure instrument response to a spatially-uniform input) calibration, or for matching/accounting for differences from the solar spectrum.

Figure 9:
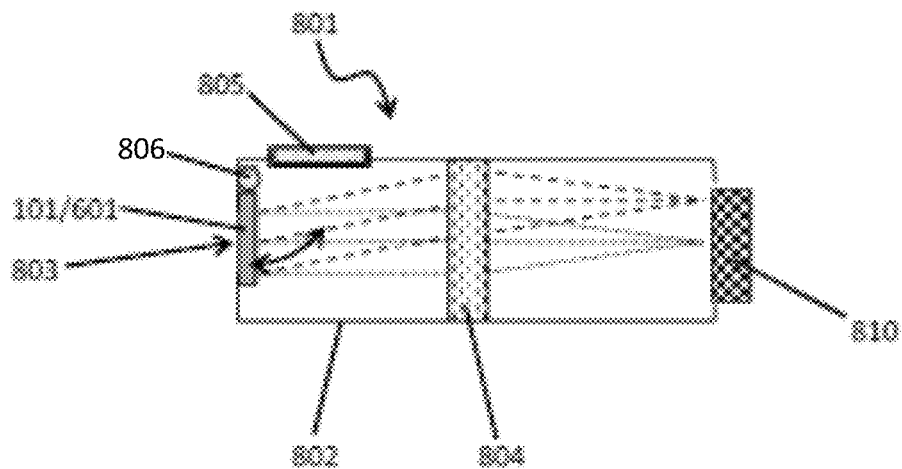
FIG. 9 is a schematic diagram of additional components of a detector apparatus in accordance with embodiments.
Figure 10:
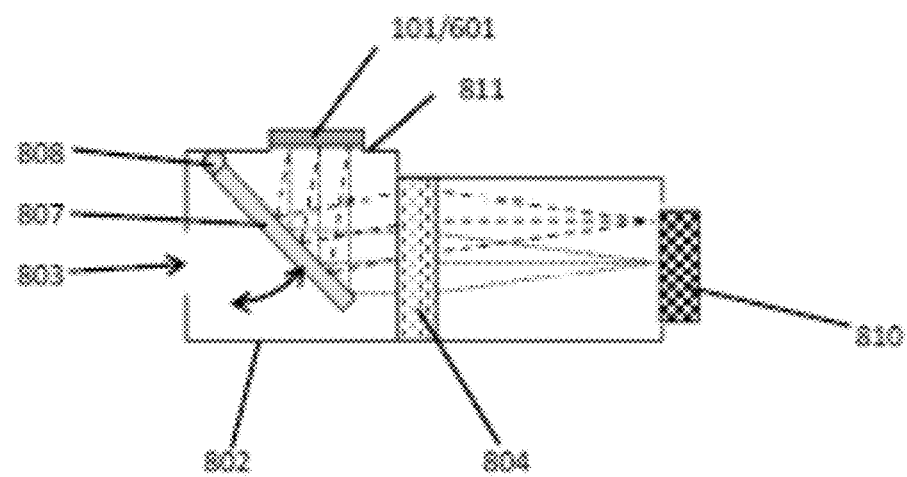
FIG. 10 is a schematic diagram of additional components of a detector apparatus in accordance with embodiments.

With reference to FIGS. 9 and 10, more detailed embodiments of the detector apparatus 801 are shown. In each case, the detector apparatus 801 includes a housing 802 having a long axis with a first pupil 803 at a first end of the long axis, the detector element 810 at a second end of the long axis opposite the pupil, optical elements 804 interposed between the first pupil 803 and the detector element 810.

As shown in FIG. 9, the detector apparatus 801 can further include an optional light trap 805 and a hinge 806 to which the broadband calibrator 101/601 is coupled whereby the broadband calibrator 101/601 can pivot between a first (deployed) position at which the broadband calibrator 101/601 obstructs the first pupil 803 and a second (retracted) position at which the broadband calibrator 101/601 abuts the optional light trap 805. With the broadband calibrator 101/601 in the second position, on- and off-axis optical input can pass through the first pupil 803 and propagate toward the detector element 810 via the optical elements 804 while the optional light trap 805 allows the broadband calibrator 101/601 to be powered without introducing stray light or mechanical distortions into the system. With the broadband calibrator 101/601 in the first position, on- and off-axis optical input through the first pupil 803 is blocked while on- and off-axis optical input from the broadband calibrator 101/601 at the first pupil 803 propagates toward the detector element 810 via the optical elements 804.

As shown in FIG. 10, the broadband calibrator 101/601 can be set inside a cavity formed in the housing 802 of the detector apparatus 801 and the detector apparatus 801 can further include a mirror 807 and a hinge 808 to which the mirror 807 is coupled whereby the mirror 807 can pivot between a first (deployed) position at which the mirror 807 is pivoted away from the broadband calibrator 101/601 and at least partially obstructs the first pupil 803 and a second (retracted) position at which the mirror 807 abuts the broadband calibrator 101/601 fixed in position at second pupil 811. With the mirror 807 in the second position, on- and off-axis optical input can pass through the first pupil 803 and propagate toward the detector element 810 via the optical elements 804. With the mirror 807 in the first position, on- and off-axis optical input through the first pupil 803 is blocked while on- and off-axis optical input from the broadband calibrator 101/601 at second pupil 811 reflects off the mirror 807 and propagates toward the detector element 810 via the optical elements 804.

While it is advantageous to locate the broadband calibrator 101/601 at the pupil of an imaging system to produce uniform illumination on the detector element 810, the broadband calibrator 101/601 may be positioned at other locations in the optical path in a manner that produces a repeatable and characterizable illumination pattern on the detector element 810.

Figure 11:
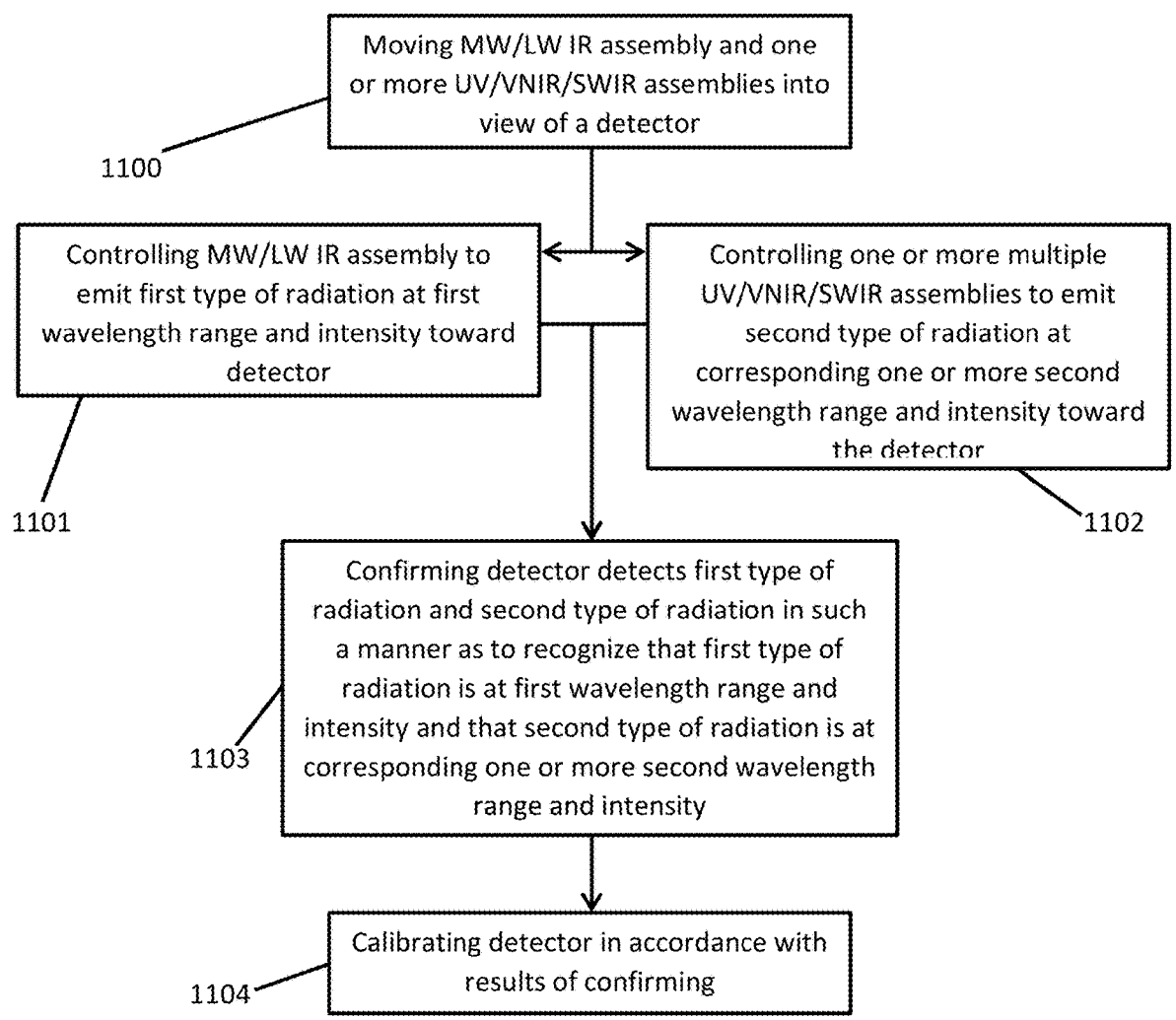
FIG. 11 is a flow diagram illustrating a method of operating a MW/LW IR assembly and multiple UV/VNIR/SWIR assemblies packaged into a broadband calibrator assembly in accordance with embodiments.

With reference to FIG. 11, a method of operating a MW/LW IR assembly and multiple UV/VNIR/SWIR assemblies packaged into a broadband calibrator assembly as described above is provided. The method includes moving the MW/LW IR assembly and one or more of the multiple UV/VNIR/SWIR assemblies into view of a detector 1100 (in some cases, only the one or more of the multiple UV/VNIR/SWIR assemblies are moved into view of the detector), controlling one or more of the multiple UV/VNIR/SWIR assemblies to emit a second type of radiation at a corresponding one or more second wavelength range toward the detector 1102, confirming that the detector detects the first type of radiation and the second type of radiation in such a manner as to recognize that the first type of radiation is at the first wavelength range and that the second type of radiation is at the corresponding one or more second wavelength range 1103 and calibrating the detector in accordance with results of the confirming 1104.

In accordance with embodiments, the calibrating of operation 1104 includes at least one of determining that the detector recognizes that the first type of radiation is at a wavelength range, which is different from the first wavelength range and compensating for the difference and determining that the detector recognizes that the second type of radiation is at one or more wavelength ranges, which is respectively different from the corresponding one or more second wavelength range and compensating for the difference.

Technical effects and benefits of the present invention are the provision of the MW/LW IR assembly and the multiple UV/VNIR/SWIR assemblies in a compact, thin-profile package which is capable of broadband calibration with 90% reduced power consumption, 70% reduced size and 70% reduced weight as compared to conventional broadband calibrators.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A broadband calibrator assembly, comprising:
    a medium/long wave infrared (MW/LW IR) assembly comprising a carbon nanotube (CNT) forest layer configured to emit radiation responsive to an application of heat; and
    multiple ultraviolet (UV)/visible and near IR (VNIR)/short wave IR (SWIR) assemblies, each of the multiple UV/VNIR/SWIR sources comprising:
    an LED array configured to emit first radiation at a first wavelength; and
    a conversion panel configured to convert the first radiation into second radiation and to emit the second radiation at a second wavelength differing from the first wavelength.

2. The broadband calibrator assembly according to claim 1, wherein:
    the MW/LW IR assembly further comprises thermally conductive and thermally nonconductive layers,
    the thermally conductive layer comprises one or more of a CNT sheet, a graphene sheet and a substrate formed of one or more of a semiconductor, ceramic and diamond, and
    the thermally non-conductive layer comprises one or more of adhesive and silicon dioxide.

3. The broadband calibrator assembly according to claim 1, wherein the MW/LW IR assembly further comprises a heating element to apply heat to the CNT forest layer.

4. The broadband calibrator assembly according to claim 3, the heating element comprises one or more of a CNT sheet and a graphene sheet.

5. The broadband calibrator assembly according to claim 1, wherein:
    the CNT forest layer has an annular shape and the MW/LW IR assembly further comprises a ring element disposed about a perimeter of the CNT forest layer, and
    the multiple UV/VNIR/SWIR assemblies are supported by a panel in the ring element about the perimeter of the CNT forest layer.

6. The broadband calibrator assembly according to claim 1, wherein:
    the CNT forest layer has a rectangular shape,
    the MW/LW IR assembly further comprises a frame element disposed about a perimeter of the CNT forest layer, and
    the multiple UV/VNIR/SWIR assemblies are supported by a panel in the frame element about the perimeter of the CNT forest layer.

7. The broadband calibrator assembly according to claim 6, wherein the frame element is configured to thermally isolate the MW/LW IR assembly from the UV/VNIR/SWIR assembly.

8. The broadband calibrator assembly according to claim 1, wherein the LED array comprises LEDs configured to emit light in various frequencies.

9. The broadband calibrator assembly according to claim 1, wherein the MW/LW IR assembly is formed to define apertures, each aperture comprising an opening or spectral filters respectively corresponding to a corresponding one of the multiple UV/VNIR/SWIR assemblies.

10. The broadband calibrator assembly according to claim 9, wherein each aperture comprises one or more of lenses, filters and windows.

11. The broadband calibrator assembly according to claim 10, wherein each of the lenses comprises one or more of Fresnel lenses and metasurfaces.

12. The broadband calibrator assembly according to claim 1, wherein the conversion panel comprises a phosphor layer.

13. The broadband calibrator assembly according to claim 12, wherein the phosphor layer comprises one or more of phosphors with an emission wavelength of 0.4-0.3 μm dispersed on a carrier layer.

14. The broadband calibrator assembly according to claim 13, wherein the phosphor layer comprises colloidal quantum dots.

15. The broadband calibrator assembly according to claim 13, wherein the carrier layer comprises one or more of acrylic, polyethylene terephthalate (PET), polycarbonate, polydimethylsiloxane (PDMS), borosilicate, Germanium, ZnS, ZnSe, Silicon, $SiO_2$, crown glasses, diamond, silicon carbide and sapphire.

16. The broadband calibrator assembly according to claim 1, further comprising:
    a panel adjacent to the MW/LW IR assembly; and
    a housing to house the MW/LW IR assembly, the panel, each of the multiple UV/VNIR/SWIR assemblies and one or more thermal modulating elements interposed between the MW/LW IR assembly and the panel.

17. The broadband calibrator assembly according to claim 16, wherein each of the one or more thermal modulating elements abuts with a rear surface of the MW/LW IR assembly.

18. The broadband calibrator assembly according to claim 17, wherein each thermal modulating element comprises a thermoelectric cooler.

19. The broadband calibrator assembly according to claim 1, wherein the MW/LW IR assembly and the multiple UV/VNIR/SWIR assemblies are disposed in a detector apparatus comprising:
    a detector element; and
    a controller,
    the MW/LW IR assembly and the multiple UV/VNIR/SWIR assemblies being movable into view of the detector element and the controller being configured to:
    control the MW/LW IR assembly to emit a first type of radiation at a first wavelength range and intensity toward the detector element, control one or more of the multiple UV/VNIR/SWIR assemblies to emit a second type of radiation at a corresponding one or more second wavelength range and intensity toward the detector element, confirm that the detector element detects the first type of radiation and the second type of radiation in such a manner as to recognize that the first type of radiation is at the first wavelength range and intensity and that the second type of radiation is at the corresponding one or more second wavelength range and intensity and calibrate the detector element in accordance with results of the confirming.

20. The broadband calibrator assembly according to claim 1, wherein the MW/LW IR assembly and the multiple UV/VNIR/SWIR assemblies are disposed in a detector apparatus comprising:
a detector element; and
a controller,
at least the multiple UV/VNIR/SWIR assemblies being movable into view of the detector element and the controller being configured to:
control one or more of the multiple UV/VNIR/SWIR assemblies to emit a type of radiation at a corresponding one or more wavelength range and intensity toward the detector element, confirming that the detector element detects the type of radiation in such a manner as to recognize that the type of radiation is at the wavelength range and intensity and calibrating the detector element in accordance with results of the confirming.

21. A medium/long wave infrared (MW/LW IR) assembly for use in a broadband calibrator, the MW/LW IR assembly comprising:
a heating element; and
a carbon nanotube (CNT) forest layer comprising windows or apertures,
the CNT forest layer further comprising a layer of at least one of graphene paper and coplanar, parallel CNTs and being configured to emit radiation along longitudinal axes of the coplanar, parallel CNTs in response to an application of heat by the heating element.

22. The MW/LW IR assembly according to claim 21, wherein the CNT forest layer has an annular shape.

23. The MW/LW IR assembly according to claim 21, wherein the CNT forest layer has a rectangular shape.

24. A method of operating a medium/long wave infrared (MW/LW IR) assembly and multiple ultraviolet (UV)/visible and near IR (VNIR)/short wave IR (SWIR) assemblies packaged into a broadband calibrator assembly, the method comprising:
controlling the MW/LW IR assembly to emit a first type of radiation at a first wavelength range and intensity toward a detector;
controlling one or more of the multiple UV/VNIR/SWIR assemblies to emit a second type of radiation at a corresponding one or more second wavelength range and intensity toward the detector;
confirming that the detector detects the first type of radiation and the second type of radiation in such a manner as to recognize that the first type of radiation is at the first wavelength range and intensity and that the second type of radiation is at the corresponding one or more second wavelength range and intensity; and
calibrating the detector in accordance with results of the confirming.

25. The method according to claim 24, wherein the calibrating comprises at least one of:
determining that the detector recognizes that the first radiation is at a wavelength range, which is different from the first wavelength range and intensity and compensating for the difference; and
determining that the detector recognizes that the second radiation is at one or more wavelength ranges, which is respectively different from the corresponding one or more second wavelength range and intensity and compensating for the difference.

26. The method according to claim 24, wherein the MW/LW IR assembly and the multiple UV/VNIR/SWIR assemblies are located at a pupil of an optical system.

* * * * *